United States Patent [19]

Jordan

[11] Patent Number: 5,226,384
[45] Date of Patent: Jul. 13, 1993

[54] DAMAGE- AND PEST-RESISTANT ANIMAL BED

[76] Inventor: Elizabeth S. Jordan, One Lodge Ct., Oakland, Calif. 94611

[21] Appl. No.: 867,397

[22] Filed: Apr. 13, 1992

[51] Int. Cl.$^5$ ............................................. A01K 29/00
[52] U.S. Cl. ......................................... 119/28.5; 5/459; 5/420
[58] Field of Search .................. 119/28.5; 5/459, 483, 5/448, 473, 495, 413, 420, 490, 500

[56] References Cited

U.S. PATENT DOCUMENTS

| | | | |
|---|---|---|---|
| 3,066,646 | 12/1962 | Bramley | 119/28.5 |
| 3,273,177 | 9/1966 | Newton | 5/483 |
| 3,565,040 | 2/1971 | Pohl | 119/28.5 |
| 4,450,193 | 5/1984 | Staebler | 5/420 |
| 4,463,464 | 8/1984 | Bost et al. | 5/490 |
| 4,463,465 | 8/1984 | Parker et al. | 5/459 |
| 4,623,571 | 11/1986 | Yamamoto et al. | 5/459 |
| 4,866,799 | 9/1989 | Glackin | 5/459 |
| 5,002,014 | 3/1991 | Albin | 119/28.5 |

FOREIGN PATENT DOCUMENTS 397947 11/1990 European Pat. Off. ............... 5/459

OTHER PUBLICATIONS duPont Co. Brochure H-05500-1 "The Uncommon Material for Uncommon Solutions" (date unknown).
Brady et al., *Materials Handbook* (11th edn., 1977), p. 607.
Cagle, *Handbook of Adhesive Bonding* (1973), pp. 3-1, 19-1, 19-16.
Seymour, *Engineering Polymer Sourcebook*, (1990), pp. 185-186.
North Sails ad, *Sail*, 52-53 (Apr., 1992).

*Primary Examiner*—Gene Mancene
*Assistant Examiner*—Todd E. Manahan
*Attorney, Agent, or Firm*—Brown, Martin, Haller & McClain

[57] ABSTRACT

An animal bed is disclosed which is resistant to damage and infiltration by pests. It is formed of a resilient core having generally a slab shape and, surrounding and encasing the core, a cover formed of at least an aramid fabric sheet. In a preferred form, the cover is a laminate made of the aramid fabric sheet with a polyester fabric sheet laminated to it. Preferably these materials are respectively a KEVLAR ® aramid sheet and a MYLAR ® polyester sheet. The core of the bed is preferably made of resilient polymeric foam, rubber, fiber fill, wood shavings or wood chips, of which the foam or rubber is preferred. A soft cloth coverlet can be used to cover the entire bed if desired. The bed of this invention is highly resistant to destructive activities of the animal, such as biting or clawing. It is also impervious to water and to pest infestation. It can be easily cleaned and is portable. Uses include beds for show dogs and hunting dogs, and as whelping beds.

11 Claims, 1 Drawing Sheet

1

DAMAGE- AND PEST-RESISTANT ANIMAL BED

BACKGROUND OF THE INVENTION

1. Field of the Invention

The invention herein relates to beds for animals. More particularly it relates to beds for small animals, such as household pets.

2. Description of the Prior Art

Many owners of household pets such as dogs and cats provide special beds on which the pet normally rests and sleeps. In many cases, the beds are quite simple, consisting of a folded blanket, an old bed pillow, a cushion or the like. However, beds can be much more elaborate.

There are several problems common to all types of animal beds. Many pets chew or claw the bed, tearing or shredding the bed material. In some cases, the pet in chewing on the bed material ingests some of the material and can thus become ill or even die. Further, since household pets commonly carry pests such as fleas, the pests are transferred to and infiltrate the bedding. Similarly, since all animals, even those which are regularly groomed, are to some extent dirty, the dirt and oils of the pet's body are transferred to the bedding. Since the bedding cannot normally be effectively cleaned, the bedding must periodically be discarded to rid the pet's sleeping area of the infestation or when an unacceptable level of soil or odor accumulates.

Discarding and replacing pet bedding on a frequent basis can become expensive and is an annoyance to the pet owner. This is particularly true where the pet is prone to damage the bedding quickly. For instance, it is not uncommon for a dog to chew its bedding severely within the first few days that it has the bedding. The same is true of some cats clawing the bedding severely. Clearly, replacement of bedding every few days is completely impractical. In addition, since many beds are made in part of shredded foam, there is an environmental concern with disposal of the bed.

Most present pet bedding usually remains in one location, since it is often impractical to move the bedding. Thus when a pet's sleeping area becomes uncomfortably hot or cold, the pet owner is not able to move the pet's bed to a more comfortable location, so the pet is either forced to sleep in the existing uncomfortable location or finds an alternative sleeping location in a more comfortable place, which may be unacceptable to the pet owner if for instance the pet attempts to sleep on the owner's furniture. Also, pet owners often wish to provide alternative sleeping areas for their pets such as a location on a porch or patio where the pet can rest and enjoy pleasant outdoor weather, as compared to being confined to a house, garage or other enclosed area where the pet would otherwise sleep.

It would therefore be advantageous to have an animal bed which is highly resistant to the animal's chewing, clawing or other damaging actions and which is also highly resistant to infestation by common animal pests, such as insects and fleas. It would further be advantageous for the bed to be such that it can be readily and easily cleaned and for it to be readily portable and able to resist the vagaries of weather.

SUMMARY OF THE INVENTION

In its broadest form, the invention herein is an animal bed resistant to damage and infiltration by pests, which comprises a resilient core having generally a slab shape and, surrounding and encasing the core, a cover comprising an aramid fabric sheet. In a preferred form, the cover comprises a laminate made of the aramid fabric sheet with a polyester fabric sheet laminated to it. These materials are preferably respectively a KEVLAR® aramid sheet and a MYLAR® polyester sheet. The core of the bed is preferably made of resilient polymeric foam, rubber, fiber fill, wood shavings or wood chips, of which the foam or rubber is preferred. A soft cloth coverlet can be used to cover the entire bed if desired.

The bed of this invention is highly resistant to destructive activities of the animal, such as biting or clawing. It is also impervious to water and to pest infestation. It can be easily cleaned, is light weight and portable.

BRIEF DESCRIPTION OF THE DRAWINGS

FIG. 3, composed of alternative

DETAILED DESCRIPTION AND PREFERRED EMBODIMENTS

Figure 1:
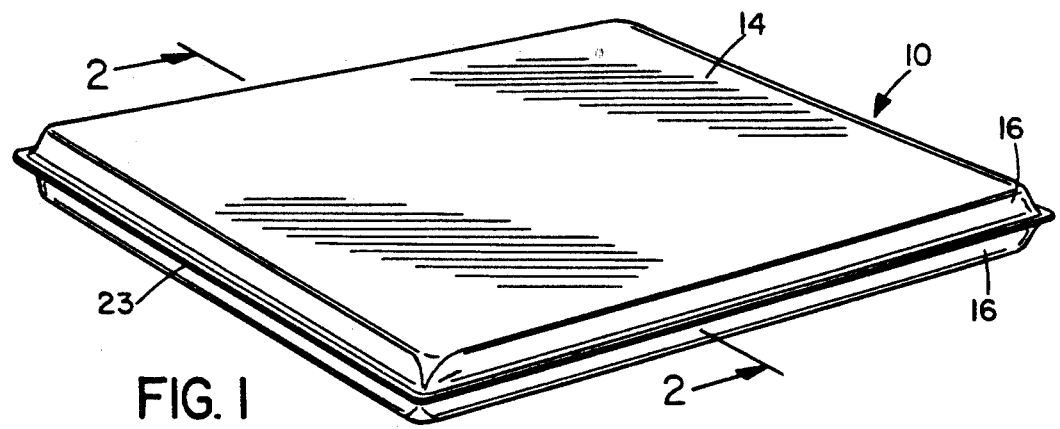
FIG. 1 is an oblique view of one embodiment of the animal bed of the present invention.
Figure 2:
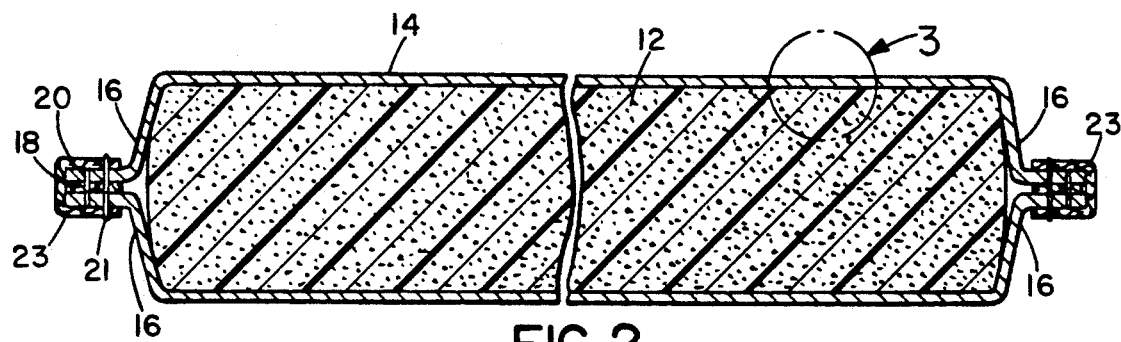
FIG. 2 is a cross-sectional view of the bed of FIG. 1 taken on Line 2—2.

The bed of the present invention will be best understood by reference to the drawings. FIGS. 1 and 2 illustrate one principal embodiment of the bed 10 of the present invention. The bed 10 is formed of a core 12 which has a generally block or slab shape and which is resilient, but moderately firm, so that the bed will generally retain its shape when the pet reclines on it, but will yet have sufficient resilience to provide a comfortable resting place for the pet. The core itself may be shape sustaining, in which it will be made of a material such as a polymeric foam material (such as polyurethane or polystyrene foam), a natural or synthetic rubber, or of a packed and formed body of fiber fill such as cotton packing.

Alternatively, the core 12 may be of a loose fill material, such as loose fiber fill of cotton, down or similar fibers, or of loose particulate material such as wood shavings or chips or the foam package packing materials commonly referred to as "popcorn" or "peanuts." In the case of the loose fill material, the bed shape will be defined by the cover and the loose fill material will be packed into the cover sufficiently densely to allow the bed to maintain its shape in generally the same way as if the core materials had been itself shape-sustaining as described above. As will be evident to those skilled in the art, the shape retaining properties, whether directly from the core or through the core and cover combination, is generally analogous to the resilience and shape-retaining properties of typical bed and furniture pillows and cushions for use by people.

It is also possible to have the core formed of a hollow bladder of rubber or some other nonporous material with the bladder being filled with air or water, in a manner analogous to an air mattress or water bed.

Preferably, the core will be of a shape-sustaining polymeric foam or rubber material or of a relatively coarse fill material such as wood shavings or chips. Other materials such as the loose fiber fill or foam particles are not preferred since if the animal does manage to rip the bed open, it can then ingest the particulate materials and possibly be harmed. Also, when the bed is ripped opened, the particulate material can spill out and be quite difficult for the pet owner to clean up. The spilled material may also pose an environmental problem. Similarly, the air and water filled bladders are not preferred, since if they are punctured by the animal's teeth or claws, they will deflate and, in the case of the water fill, the area around the animal bed will become soaked with the leaking water.

Surrounding the core 12 and encasing it on all sides is cover 14. The material of which cover 14 is made is critical to the function and properties of the present invention, as will be described below. The cover 14 itself may be secured to the core 12 by having it in two or more pieces, which may be of equal or different sizes or shapes, and which are secured together. In a preferred manner of securing, a hem 16 is formed at the edge of each piece of the cover 14. The facing surfaces of the hems 16 are taped together at their seam by double-sided tape 18 and then sewn with thread 20. Alternatively, an adhesive can be applied to the seam to bond the hems 16 together. Once the hems 16 are bonded, a cover strip 23 is folded around them and then secured by further stitching with thread 21. This sealed and covered seam area is substantially pest- and moisture-impervious.

Figures 4, 5:
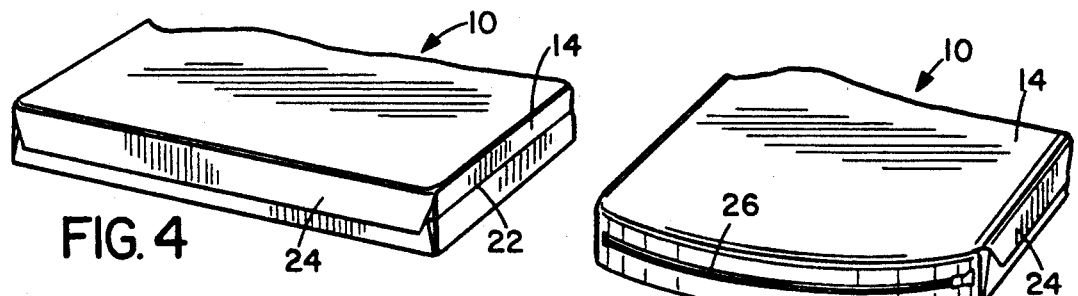
FIG. 4 is a partial oblique view of an end of an embodiment of the bed of this invention illustrating an alternative means of securing the cover.
FIG. 5 is a partial oblique view similar to that of FIG. 4 illustrating another embodiment of the cover and bed of the present invention.

Alternatively, one can form the cover as a generally tubular form with an overlapping side seal 22, with the ends of the tube closed by overlapping end panels 24, in much the same way that one commonly wraps a package, as illustrated in FIG. 4. The side seam 22 and end panels 24 will normally be secured by a suitable adhesive. Stitching may be possible, although it is relatively difficult and therefore not preferred.

It is also desirable to be able to have access to the interior of the cover 14 while yet keeping the cover essentially closed around the core 10. This can be accomplished by inclusion of zipper or hook-and-loop fastener (such as a "Velcro ®" fastener) 26 along one side or end of the bed 10 as illustrated in FIG. 5. Access to the interior will for instance allow the pet owner to replenish loose fill when, as inevitably happens, the loose fill becomes excessively packed from the cumulative effect of the pet's resting or sleeping on the bed.

Figure 6:
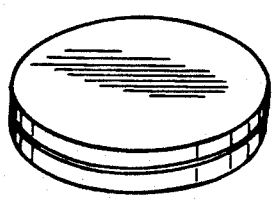
FIGS. 6 and 7 are oblique views of two other configurations of the bed of this invention.
Figure 7:
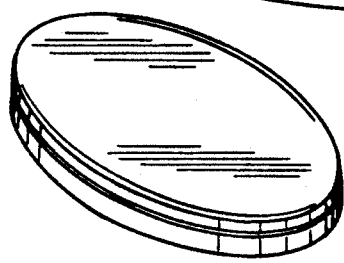

The bed shape resulting from the core shape or the core/cover combination will generally be that of a rectangular solid as shown in FIGS. 1 and 4, with the edges normally rounded as shown in FIG. 2. It is possible that the edges may have a fairly sharp profile, but the materials of the present invention of the cover as defined below normally assume a rounded configuration. The bed may also have alternative shapes such as the generally oval shape shown in FIG. 7 or round shape shown in FIG. 6. Other shapes such as polygonal or free form may be used. One can also form novelty shapes, such as a heart shape, by appropriate cutting, forming, sewing or bonding of the core material and the cover material if desired.

The size of the bed may be varied as desired. For small animals, such as cats and small dogs, smaller sizes will be used. Typically these may have top surfaces of about 15"–24" (38–61 cm) on a side, and are about 2"–5" (5–13 cm) thick. For larger animals, such as larger and heavier dogs, the bed will typically have dimensions of about 24"–42" (61–107 cm) on a side and thicknesses of about 3"–8" (7–20 cm). In one significant use, the beds will be sized to fit the various sizes for travel kennels, to permit animals to travel in more comfort while also making the commercial travel kennels (as used by airlines, railroads, etc.) easily cleanable and re-usable. In another use, the bed can be sized to conform to the back of a car, station wagon, or truck, to provide a comfortable place for the animal to rest during travel.

As illustrated in FIG. 3, the cover 14 is formed of a single sheet material or is a laminate formed by bonding or adhering two (or more) sheets. The sheets will be respectively designated 28 and 30 and the adhesive designated 32.

Figures 3A, 3B, 3C:
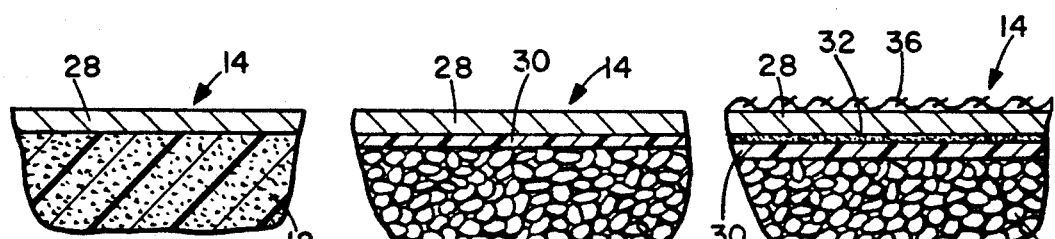
FIGS. 3A, 3B and 3C, is a detailed view of a portion of the cross-section of FIG. 2 as indicated by the circle 3, illustrating alternative forms of the cover of the present invention.

The principal critical material of the cover is the sheet 28 which forms either the sole layer of the cover as indicated in FIG. 3A or the outer layer of the cover as indicated in FIGS. 3B and 3C. It is critical to the function and properties of the present invention that this layer 28 be formed of an aramid polymeric sheet material. Readily available commercially, and therefore preferred, is an aramid material sold under the trademark "KEVLAR ®" by the duPont Company. The KEVLAR ® product is initially in a fibrous form as short fiber or filament from which it can be formed into felt, woven fabric or webbing. For the present invention, it is the woven fabric which is most useful, although a felt or webbing would also be suitable if properly joined to form the sheet 28 of cover 10. The chemical composition of the KEVLAR ® aramid has been described as poly(p-phenylene-diamine-co-terephthalic acid) in Seymour, *Engineering Polymer Sourcebook* (1990), §12.7, although it will be understood that other aramid polymers which have generally similar fabric forming properties can be used in the present invention.

The aramid sheet 28 will be of a normal fabric grade typical of that used for protective clothing, sail cloth or the like. Some aramid fiber materials are made of unusual density, to provide extraordinary protection as in bullet proof vests for police officers. It is not contemplated in the present invention that the aramid sheet fabric 28 should be of that great a density.

In the preferred embodiment illustrated in FIGS. 3B and 3C, a second sheet material designated 30 is adhered to the surface of the aramid sheet 28. The sheet 30 will be a polyester material which enhances the tear resistance and low porosity or permeability of the cover 14. A preferred type of polyester sheet is formed of polymeric materials resulting from the condensation polymerization of terephthalic acid and ethylene glycol, and sold commercially by the duPont Company under the trademark "MYLAR ®". The properties of these materials are well described in the literature; e.g. Brady et al., *Materials Handbook* (11th edn.; 1977), page 607. It is contemplated that there a number of polyester materials of similar properties of which would also be suitable.

The sheet 30 commonly is thinner than the sheet 28, although they may be of equal thickness or the polyester sheet may be thicker. The commercial polyester materials are sold in a variety of sheet thicknesses and normally any of the common sheet thicknesses will be suitable for the present invention.

The sheets 28 and 30 will be bonded together by conventional adhesion techniques. In some cases, the materials may bond suitably by thermal adhesion, in which the two sheets are placed against each other and heated, and the adjacent surfaces soften and interconnect, such that when the laminated sheet is subsequently cooled, a permanent physical bond between the sheets 28 and 30 is formed. Alternatively, and usually more preferably, an adhesive 32 will be used to bond the sheets 28 and 30 together. The adhesive may be applied as a continuous film across the bond surfaces or the adhesive may be placed in discrete areas of the two surfaces for a discontinuous bond. A number of different adhesives are known that will work suitably and are referenced in the literature; see, e.g., Cagle, *Handbook of Adhesive Bonding* (1973), particularly chapters 3 and 19. Many are proprietary materials sold commercially on the basis of their adhesive characteristics but with their actual chemical compositions not fully disclosed. A typical adhesive known to be suitable for bonding a KEVLAR ® aramid sheet and a MYLAR ® polyester sheet is a commercial proprietary soft epoxy adhesive; see also the aforesaid Cagle reference, §19.16.

A suitable and preferred laminate material for use as the cover 14 of the present invention is a KEVLAR ® aramid/MYLAR ® polyester sheet laminate adhered by the aforementioned epoxy material and used as a sail cloth, particularly for high performance sail boats. Materials of this type are commercially available from sail manufacturing companies, such as North Sail Company of Connecticut and Bainbridge Sail Company of California. It is not necessary that original sail cloth be used; it has been found that used sail cloth which has been damaged in sailing (as by a sail ripping, for instance) still presents ample usable material to form the covers for the beds of this invention. Similarly, one could use "seconds," off-spec or other sail cloth products which are, for reasons unrelated to the present beds, not suitable for their intended use as sail materials for racing.

If desired, one can also encase the entire bed 10 in a further soft cloth casing, such as a pillow case, as indicated at 36. This may be to provide a decorative cover or coverlet or to provide a more comfortable soft cloth for the pet to lie on. It also may have sanitary purposes, since the casing or coverlet 36 may be easily slipped off of the bed and washed in a home washing machine. Such casings are commonly made of cotton or cotton blends in the same manner as conventional pillow cases, sheets and the like.

Alternatively, the outer surface of the cover itself may be decorated, as by silk screening, painting, printing or other image forming means. The ink, paint or other material forming the decorative patterns will be selected so as to bond firmly to the aramid cover surface without damaging the surface, to be readily applied, and to be non-toxic, non-irritating and otherwise harmless to the animal.

The unique beds of the present invention with the critical use of the aramid fiber sheets and preferably the additional polyester sheets to form a laminate, provide a number of unique and highly desirable properties heretofore unobtainable in animal beds. A first and most important property is that the bed of this invention is highly resistant to chewing, clawing, scratching or other damaging activities common to most pets. As an example, a household pet Labrador retriever dog commonly would chew any dog bed material provided to it, such that typical commercial dog beds were often destroyed by this dog within a matter of hours. However, when presented with a dog bed made with a cover of the present invention made of the preferred commercial sail cloth described above, the dog was unable to inflict any significant damage on the bed, notwithstanding repeated chewing and tearing efforts.

Further, it has been found that the dog beds of this invention are generally impervious to infestation by fleas and other common animal-borne pests. Such pests can get on the outer surface of the cover 12, but cannot penetrate into or through the cover 10 into the interior of the bed 12, so that the interior of the bed remains free of pest infestation. Also, by being confined to the outer surface, the pests are easily washed or wiped away. If desired, a suitable pesticide may also be applied to the outer surface to kill the pests on contact. Such pesticide, of course, would necessarily be one which would cause no harmful effects to the pet and which was chemically compatible with the aramid sheet material.

It will be evident that the beds of this invention are easily portable, being of generally pillow size and quite light weight. They can therefore be readily carried by the pet owner to various locations so that the pet can enjoy its familiar bed inside a house or garage or outside on a patio or porch. In this regard, it has also been found that the beds of the present invention are not harmed by weather or ambient conditions, such as direct sunlight or rain. It will be preferable to keep the bed out of prolonged high temperatures and sun, since the surface can perhaps get uncomfortably warm for the pet. Similarly, if the bed is subjected to severe cold, as by being left outside in the winter, the cover may stiffen to some extent.

Another potential use for a bed of this invention is as a whelping bed for a female dog and her newborn puppies. The bed is easy to clean, more sanitary than ordinary dog beds, sawdust, papers or the like which owners and breeders have previously provided for the female dog during whelping and subsequent tending and nursing of the puppies, and dries quickly so that the puppies are not exposed to excess moisture for a prolonged period.

Further, beds of this invention have significant environmental advantages, since they can utilize materials (such as sail cloth "seconds") which would otherwise be discarded into landfills.

Yet another use for the beds of this invention are in connection with show animals, especially show dogs. Among the points judged in a show dog are its freedom from blemishes and calluses, many of which can be caused by the dog's lying on rough or irritating materials. Since the beds of this invention are smooth, easily cleaned and dry readily, a show dog can use the bed without fear on the part of the owner or breeder that the dog will incur some blemish or callus which would detrimentally affect its value for show.

Further, one can use the present bed for hunting and other outdoor dogs. Frequently when a dog comes in wet from hunting, being in the rain or snow, or other outdoor activity, it immediately goes to its bed. With ordinary bedding, the water from the dog will soak into the bedding and be retained there, so that the dog stays exposed to moisture and cold for the long period that it takes the bedding to dry. The present beds, however, dry quickly since all moisture remains on the surface and does not soak into the bed, so that the dog soon has a warm and dry place to lay.

It will be evident that there are numerous embodiments of the present invention which, while not expressly described above, are clearly within the scope and spirit of the invention. The above description is intended to be exemplary only, and the scope of the invention is to be limited solely by the appended claims.

I claim:

1. An animal bed resistant to damage and infiltration by pests, which comprises a resilient core having generally a slap shape and surrounding and encasing said core a cover comprising an aramid fabric sheet and a polyester fabric sheet laminated to a surface of said aramid fabric sheet which faces said core.

2. An animal bed as in claim 1 wherein said core is selected from the group consisting of resilient polymeric foam, rubber, fiber fill, wood shavings or wood chips.

3. An animal bed as in claim 1 wherein said aramid sheet material comprises poly(p-phenylene-diamine-co-terephthalic acid).

4. An animal bed as in claim 1 wherein said polyester sheet fabric comprises the condensation polymer of terephthalic acid and ethylene glycol.

5. An animal bed as in claim 1 having a generally rectangular shape.

6. An animal bed as in claim 1 having a generally oval shape.

7. An animal bed as in claim 1 having a generally round shape.

8. An animal bed as in claim 1 wherein said aramid fabric sheet and said polyester fabric sheet are laminated together by an adhesive therebetween.

9. An animal bed as in claim 8 wherein said adhesive comprises an epoxy polymer.

10. An animal bed as in claim 1 wherein said aramid fabric sheet and said polyester fabric sheet are laminated together by thermal bonding.

11. An animal bed as in claim 1 wherein said cover also includes means for access to the interior thereof.

* * * * *